United States Patent [19]

Tourres

[11] 4,147,249

[45] Apr. 3, 1979

[54] MACHINE FOR HANDLING CONTAINERS CONTINUOUSLY PASSING ON A MOVING BAND AND, MORE PARTICULARLY, GLASS BOTTLES

[75] Inventor: François G. Tourres, Octeville-sur-Mer, France

[73] Assignee: International Glass Equipment Co., Le Havre, France

[21] Appl. No.: 790,612

[22] Filed: Apr. 25, 1977

[30] Foreign Application Priority Data

May 4, 1976 [FR] France .................. 76 13317

[51] Int. Cl.² .................................. B65G 47/26
[52] U.S. Cl. ............................ 198/459; 198/731
[58] Field of Search ............. 198/379, 416, 425, 459, 198/461, 620, 623, 415, 721, 726, 731, 733

[56] References Cited

U.S. PATENT DOCUMENTS

| 1,851,167 | 3/1932 | Fink | 198/461 |
|---|---|---|---|
| 2,069,872 | 2/1937 | Burns | 198/461 |
| 3,026,991 | 3/1962 | Kinsley | 198/459 |
| 3,333,676 | 8/1967 | Sherman | 198/425 |
| 3,426,884 | 2/1969 | Donner | 198/379 |
| 3,452,855 | 7/1969 | Baker et al. | 198/461 |
| 3,491,511 | 1/1970 | Nigrelli et al. | 198/379 |
| 3,550,754 | 12/1970 | Ganz | 198/425 |
| 3,557,933 | 1/1971 | Sopher | 198/415 |
| 3,827,211 | 8/1974 | Zavatone et al. | 198/425 |
| 3,905,177 | 9/1975 | Herzog | 198/379 |

FOREIGN PATENT DOCUMENTS

| 914599 | 7/1954 | Fed. Rep. of Germany | 198/459 |
|---|---|---|---|
| 2145399 | 3/1973 | Fed. Rep. of Germany | 198/425 |

Primary Examiner—Robert B. Reeves
Assistant Examiner—Richard K. Thomson
Attorney, Agent, or Firm—Cushman, Darby & Cushman

[57] ABSTRACT

Apparatus for distributing in single file and for spacing objects moving on a conveyor belt, including two vertically staggered chains. The chains are driven about pinioned shafts having axes perpendicular to the conveyor belt and each is provided with removable symmetrical fingers parallel to and overlying the belt. The fingers are spaced at predetermined distances on the chain, in accordance with the diameter of the objects. The fingers engage the object to, in effect, accelerate or slow down the object's motion to provide predetermined spacing between objects. The fingers engage the objects at points in a plane parallel to the direction of motion of the conveyor belt, whereby the stability of the object is maintained.

18 Claims, 8 Drawing Figures

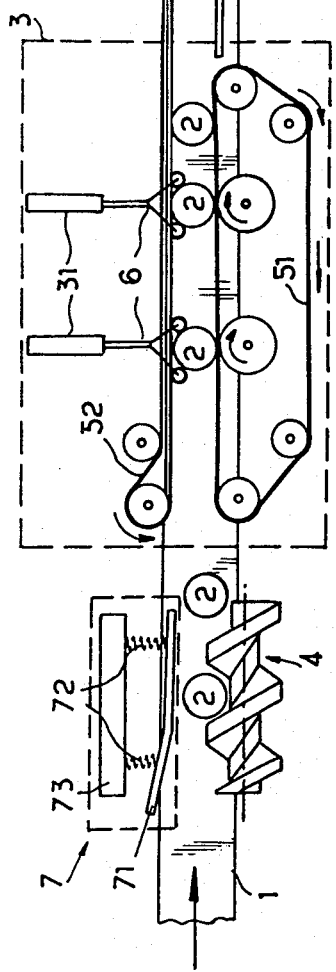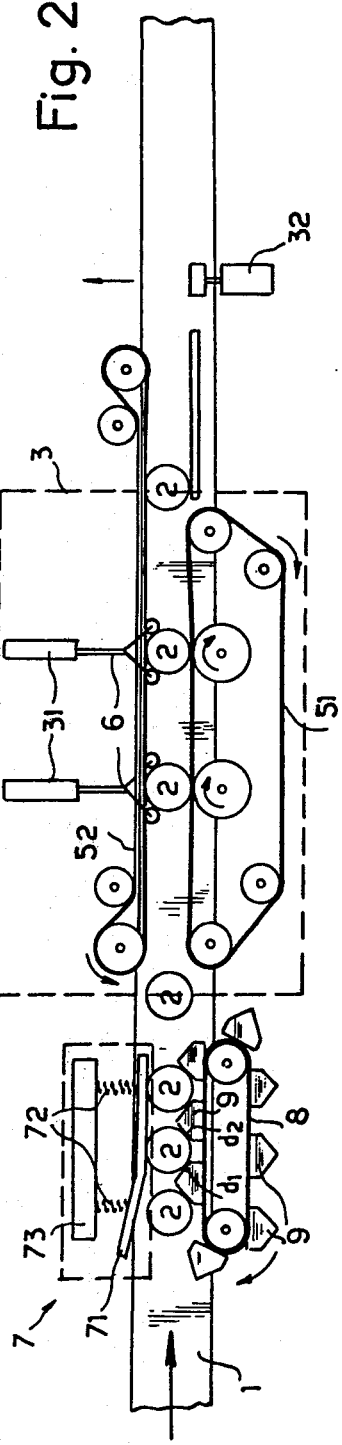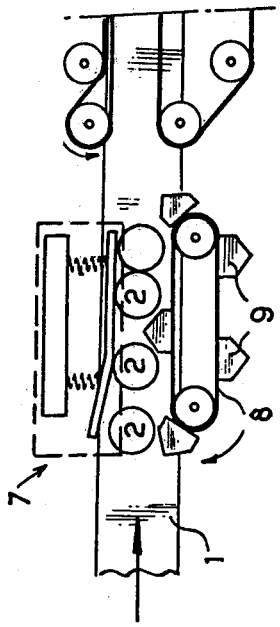

MACHINE FOR HANDLING CONTAINERS CONTINUOUSLY PASSING ON A MOVING BAND AND, MORE PARTICULARLY, GLASS BOTTLES

The present invention relates to an apparatus for handling containers continuously passing on a conveyor belt and more particularly glass bottles.

It is well known in the art that, in the production and filling of glass bottles, the bottles are often placed haphazardly, or in some arrangement other than single file, on a conveyor belt for further processing. However, it is generally necessary for the bottles to be distributed in a single file arrangement with predetermined spacing between bottles, or groups of bottles, for operation of various control stations on the bottles. To provide such single file arrangement, without requiring a decrease of production flow rate, a continuously circulating device is generally used to redistribute the bottles on the conveyor belt.

In the prior art, redistribution of the bottles is typically performed by a screw-operating device. Such screw-type devices, however, as will be hereinafter more fully explained, adversely affect the stability of the bottles on the conveyor, particularly where the bottles are irregularly shaped. In addition, the instability becomes more pronounced at increased flow rates, thus limiting the production flow rate.

The present invention provides a device for redistributing and separating bottles or other objects and guiding them once they are separated, without adversely affecting stability regardless of the bottle shape, and easily adaptable to any bottle shape. More specifically, the present invention utilizes for redistribution, one or more roller-chain type devices driven on common rollers having axes perpendicular to the direction of conveyor motion and having regularly distributed projections or fingers.

The profiles of the fingers are symmetrical with respect to vertical planes perpendicular to the direction of conveyor motion, to provide points of engagement between bottle and finger on a line parallel to the conveyor direction to assure bottle stability not obtainable either with a screw or with a conventional roller-chain.

The preferred embodiment of the present invention will now be described with reference to the appended drawing wherein like numerals denote like elements and:

FIG. 1 diagrammatically shows, seen from above, a machine for controlling bottles provided with conventional distributing means of the screw-operating type;

FIG. 2 diagrammatically shows, seen from above, the same machine which has been modified so as to include distributing means according to the invention;

FIG. 3 illustrates the manner according to which the roller-chain according to the invention is adapted for batch distribution;

Figure 4:
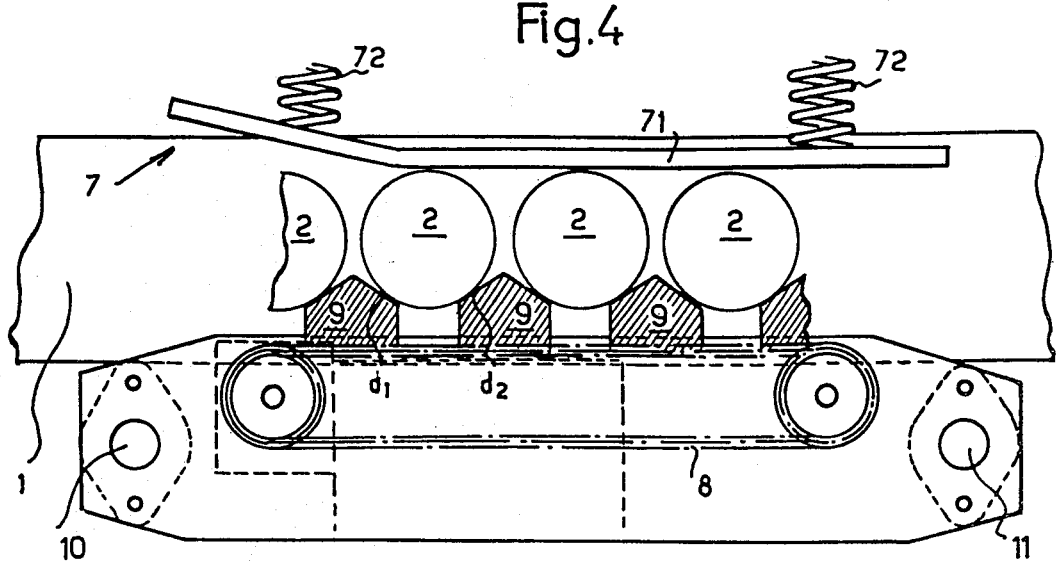
FIGS. 4 and 5 are enlarged partial views in front and in section, respectively, of the distributing means illustrated in FIGS. 2 and 3.

FIG. 1 diagrammatically shows, in plan view, the main components of a conventional prior art machine for bottle control. Bottles are supplied to a conventional conveyor in conventional manner. Bottles 2 are moved and transported away by conveyor 1 after checking at a control station 3. The arrow indicates the direction of motion of bottles. Station 3 includes, in the illustrated example, several fixed testing units 31 (two of which only are shown on the drawings), and cooperates with and controls an automatic rejection means 32. Testing units 31 may be of variable number, fixed or moveable, linearly and/or angularly. A conventional screw device 4 is utilized to redistribute bottles 2 for operation by station 3. Screw 4 has a tendency to accelerate or slow down the bottle with respect to the conveyor on which it is placed, so as to separate each bottle from the preceding or following one. Bottles 2 are arranged adjacent at the inlet on screw 4, with which cooperates a presser unit 7. Presser unit 7 includes plate 71 mounted at two ends of two springs 72, the other two ends of which are secured to a fixed body 73. Bottles are separated and distributed by screw 4 one by one on the conveyor and are picked up at the screw outlet by the belt pair 51, 52 rolling on pulleys. Belts 51, 52 transport the bottles to testing units 31 where they are stopped by forks 6 during the time required for testing.

The machine illustrated in FIG. 1 is entirely conventional. For the sake of simplicity, only the upper part of the endless conveyor 1 has been shown and the driving means therefor have not been illustrated. They may consist of a motor, preferably of the variable speed type. The conveyor has horizontal shafts at least one of which is coupled to the motor shaft. Means may be provided to regulate the tension of the conveyor.

As noted above, screw 4 tends to adversely affect the stability of bottles 2. Due to the very operating principle of a screw, bottles 2 are engaged by the screw device 4 at two points located along a line which is slanting with respect to the direction of forward motion, thus generating a torque on the bottle adversely affecting its stability.

The torque has particularly serious effects on irregularly shaped objects which do not possess a cylindrical portion at the place where they are engaged by the screw. An example of such objects is big-bellied bottles. The points of engagement of a big-bellied bottle with the screw necessarily correspond to the bottle portion having maximum diameter, requiring that the relative positions of the screw and the conveyor be accurately adjusted. When the point of engagement with the big-bellied portion lies at a certain height on the conveyor, the torque on the bottle from the screw tends to upset the bottle.

The present invention provides a device for redistributing objects on a conveyor without subjecting them to a torque. FIG. 2 shows a conveyor system, modified in accordance with the present invention. As in the system shown in FIG. 1, the modified system of FIG. 2 includes conveyor 1 on which bottles 2 are loaded, control station 3, belts 51,52, forks 6 and presser unit 7. However, in the modified machine, the screw 4 has been replaced in accordance with the invention, by a distributing device comprising one or more continuous belt members, such as roller-chains 8 (only one of them has been shown, seen from above, two identical roller-chains being in fact provided in the presently disclosed example). The roller-chains are driven about vertical axes by vertical drive shafts 10 and 11 (shown in FIG. 5) and are provided with a plurality of regularly distributed projecting parts or fingers 9 which have a symmetrical profile. Fingers 9 engage bottles 2 to vary the rate of the bottles motion in the direction of the arrow to thereby provide a predetermined separation between bottles, or groups of bottles, as will be explained.

Each finger 9 associated with a given roller-chain is both identical and symmetrical, such that the points of engagement of a bottle with the fingers are along lines parallel to the direction of motion, rather than at an angle, as is the case with a screw operating driving unit. Since all of the points of engagement are in a plane parallel to the direction of conveyor motion, no torque is produced on the bottles, thereby allowing for an increased redistribution rate. Such a device thus allows a better matching of the speed of distribution of the bottles with the flow rate capacity of the rest of the plant.

In accordance with another aspect of the invention, batch distribution may be provided for by removably mounting fingers 9 in roller-chains 8. For example, removal of every second finger 9 enables the device to carry out bottle distribution by pairs as shown in FIG. 3. Distribution by batches of two bottles is but an example; the batches may comprise more than two bottles, provided the proper number of successive fingers have been removed. Relative adjustment, at a given time, of the speed of motion of the belts 51,52 with respect to that of conveyor 1 can effect, if necessary, a division of the batch at any place along its path of motion.

The minimum spacing between two succeeding fingers when all fingers are set in position, corresponds to a distribution of one by one of bottles having a predetermined diameter at the point they engage the roller chain.

For bottles having a different diameter, fingers of a different width are used. The simple shape of fingers 9 which are illustrated on FIGS. 2 and 3 is adapted for most types of bottles. However, more intricate finger shapes may be used for distribution of bottles of specific shapes.

The number of fingers preferably is a multiple of 12, in order that the roller chain can easily be adapted to any standard bottle diameter.

Figure 5:
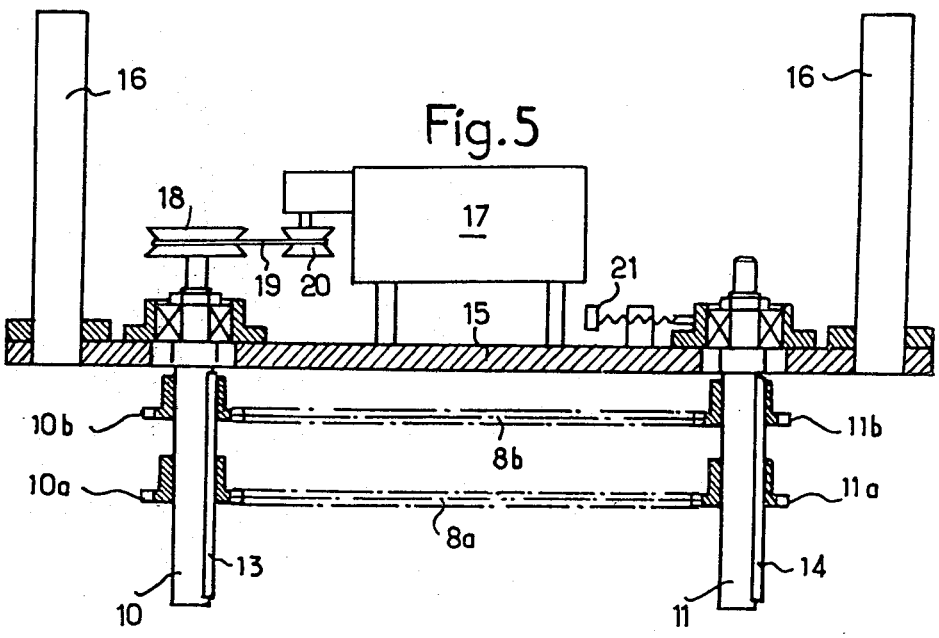

With reference to FIGS. 4 and 5, roller-chains 8 and associated fingers 9 are identical and the latter are vertically in line by pairs. The roller-chains are driven in a conventional way, by means of a single motor. They also could be driven by separate and synchronized motors. Roller-chain 8 is driven about shafts 10 and 11 via keyed pinions 10a, 11a and 10b, 11b; respectively meshing with lower and upper chains 8a and 8b. The keys shown at 13 and 14 (FIG. 5) allow for an adjustment of the chain position, together or independently of one another.

A support body 15 (FIG. 5) has mounted thereon a variable and adjustale speed motor and reducing gear assembly 17. Assembly 17 drives the chains through pulleys 18 and 20 and belt 19. Pulley 18 may be mounted on either shaft 10 or shaft 11, according to the direction of motion of bottles. The motor and reducing gear assembly 17 may also be directly mounted at the end of one of the shafts 10 and 11, without the use of a pulley. The chains may also be driven by any other mechanical means linked to the control machine for obtaining synchronization of the control machine and the distributor.

Tension of the chains 8 may be adjusted in a conventional way, for instance, as shown on the drawing, through one of the bearings slidably mounted on support 15 and pushed by a screw 21, or by means of intermediate tensioning pinions (not shown) pulling on the return sides of the chains.

The number of roller-chains 8 will be selected as a function of the height and shape of the bottles. Obviously, two roller-chains will suffice to provide vertical stability and, therefore, two roller-chains shall preferably be used.

For short containers, the upper chain is not used. It can be disconnected or removed if the coupling means so permit, which is the case, in particular, when the chains are driven by means of keyed pinions, as shown in FIG. 5.

Pillars 16 are mounted for sliding and are adapted to be latched on support members (not shown) so as to position the assembly at the desired height with respect to conveyor 1.

Figure 6B:
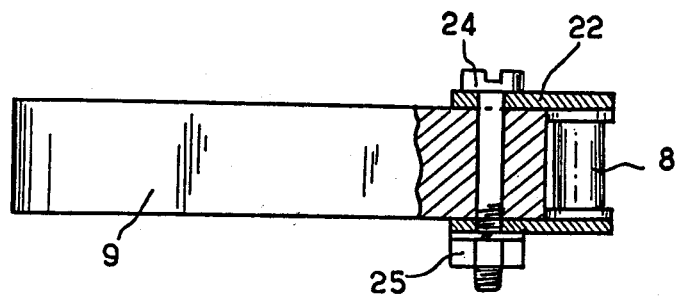
FIGS. 6a and 6b show in detail a preferred embodiment of the distributing means according to the invention.
Figure 6A:
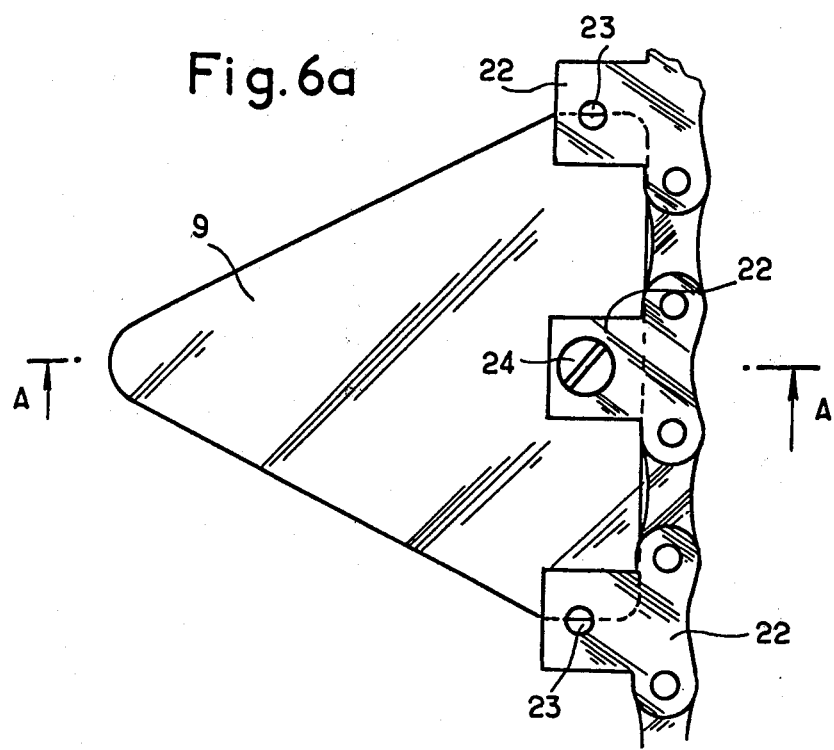

The mounting of fingers 9 may be carried out as shown on FIGS. 6a and 6b. Chains 8 are fitted with small plates 22 punched with a hole 23 through which is secured a screw 24 locked by a nut 25. Finger 9 is secured to the chain by means of screw 24. The plates 22 may be secured to each link or to only one link out of two or three.

Figure 7:
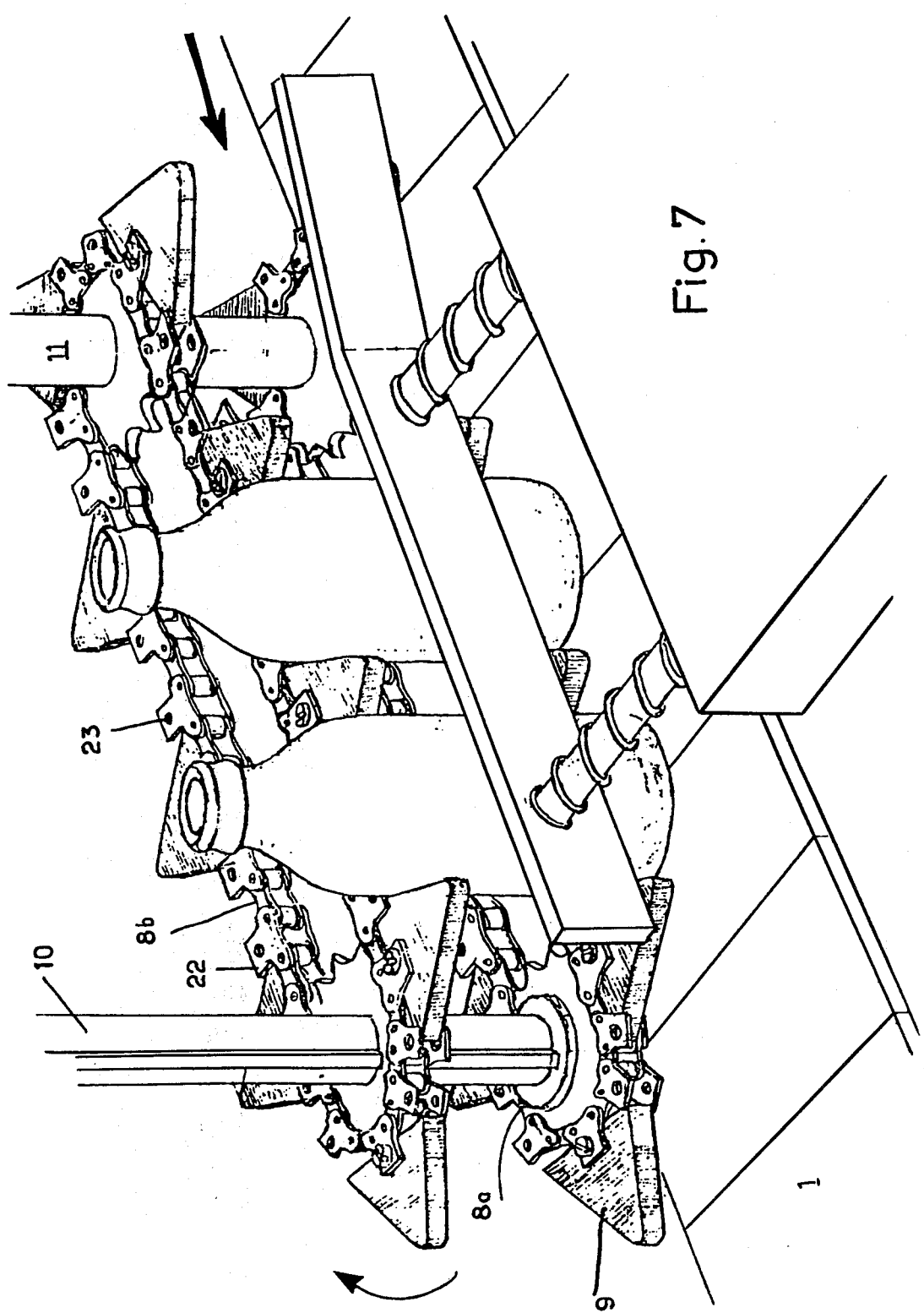
FIG. 7 is a perspective view illustrating the operation of the distributing means.

FIG. 7 is a perspective view showing the manner in which two chains 8a, 8b cooperate (support member 15 and motor 17 not shown).

Chains 8a, 8b are preferably of the same length. Use of fingers of various lengths enable them to be easily adapted for driving bottles having lower and upper diameters varying within large limits. Alternatively, adaptation may be made for such bottles by using a shorter chain at the place of lower diameter. However, in such instance, each chain would require separate drums.

Though the invention is disclosed hereinabove as being used to supply a fixed control station for bottles, it could more generally be used to supply any type of fixed or movable station and, yet more generally, to distribute solid bodies of any type for any purpose, provided the bodies have such a shape and volume that they can be distributed in a manner similar to that for bottles or containers.

What is claimed is:

1. In a production line for containers, said production line comprising a production unit, at least one control station and a moving conveyor moving said containers in a predetermined direction between the production unit and the control station, an apparatus cooperating with a predetermined length portion of the moving conveyor, for regularizing the spacing of the containers on the said length portion, said apparatus comprising:
   at least two continuous members vertically spaced apart and adapted to move parallel to said conveyor surface in said predetermined direction along at least a portion of their lengths and disposed on one side of said conveyor surface;
   a plurality of projecting members, affixed to said continuous members and overlying said conveyor, said projecting members having a symmetrical configuration about a plane perpendicular to said predetermined direction, and being regularly distributed on said continuous member at distances in accordance with the dimension of said containers so as to provide the sole points of contact between the continuous members and the containers;
   a pressure plate disposed on the other side of said conveyor surface to force said containers into engagement with said projecting members; and drive means for moving said projecting members in said predetermined direction at a predetermined rate causing said projecting members to engage said containers at points on both sides of each projecting member in two spaced-apart planes parallel to said conveyor surface also moving in said predetermined direction, whereby the stability of said containers is maintained while the rate of said containers' motion in said predetermined direction is varied as required to separate the containers by predetermined distances.

2. The apparatus of claim 1 wherein each of said two continuous members is a chain.

3. The apparatus of claim 2 wherein said at least two continuous members comprises a plurality of chains, each disposed in a plane parallel to said conveyor surface, and spaced from said conveyor surface in a perpendicular direction by respective predetermined distances.

4. The apparatus of claim 2 wherein said projecting members are each removably mounted to said chain.

5. The apparatus of claim 2 wherein said at least two continuous members comprises:
first and second chains, said chains being movable about common rotational drive members, and separated by a predetermined distance thereon;
said chains having substantially the same length.

6. The apparatus of claim 5 wherein the projecting members associated with said first and second chains are identical by pairs.

7. The apparatus of claim 1 wherein said projecting members are each removably mounted to said continuous member.

8. The apparatus of claim 1 wherein said drive means comprise:
two vertical shafts, each having a plurality of vertically spaced pulleys or pinions keyed thereto and drivingly engaged with the continuous members such that the pulleys or pinions and hence the associated continuous members are vertically adjustable on the shafts.

9. The apparatus of claim 1 wherein said drive means further comprises:
a support member carrying a pair of bearings which bearings, in turn, carry the two vertical shafts;
at least one of said bearings being adjustably mounted to permit adjustment of the tension in said continuous members.

10. The apparatus of claim 1 wherein said drive means further comprises:
a support member carrying said two vertical shafts; and
a vertically adjustable means carrying said support member so as to vertically position said apparatus above the conveyor surface.

11. A distributing device effecting separation of containers as they are being transported along a predetermined length portion of an endless horizontal conveyor in a predetermined direction between a production unit and a control station, said device comprising:
a plurality of continuous members driven by vertical drive shafts, said continuous members being vertically spaced with respect to each other and disposed on one side of said conveyor length portion, in a direction parallel thereto so as to provide the sole points of contact between the continuous members and the containers;
a plurality of projecting members affixed to each of said continuous members, said projecting members each having a profile with a vertical plane of symmetry and being regularly distributed on said continuous members; and
a pressure means disposed on the other side of said conveyor for forcing each of the moving containers into engagement with two of the moving projecting members of each continuous member at points located in vertically spaced horizontal planes whereby the stability of said containers is maintained while the rate of said containers' motion in said predetermined direction is varied as required to separate the containers by predetermined distances.

12. A device as claimed in claim 11 wherein the said projecting members are individually removable from said continuous members.

13. A device as claimed in claim 11 including means for adjusting position in height of each continuous member with respect to the conveyor.

14. A device as claimed in claim 11 wherein the said continuous members have the same length and are movable about common shafts.

15. A device as claimed in claim 14 wherein the planes of symmetry of the fingers of the two continuous members are identical by pairs.

16. A device as claimed in claim 12 including means for adjusting position in height of each continuous member with respect to the conveyor.

17. A device as claimed in claim 12 wherein the said continuous members have the same length and are movable about common shafts.

18. A device as claimed in claim 13 wherein the said continuous members have the same length and are movable about common shafts.

* * * * *